United States Patent [19]

Butz

[11] 4,355,340

[45] Oct. 19, 1982

[54] DISC PACK WITH SNAP ON HANDLE

[75] Inventor: David E. Butz, Littleton, Mass.

[73] Assignee: Data Packaging Corporation, Cambridge, Mass.

[21] Appl. No.: 220,911

[22] Filed: Dec. 29, 1980

Related U.S. Application Data

[63] Continuation-in-part of Ser. No. 104,267, Dec. 17, 1979, abandoned, which is a continuation-in-part of Ser. No. 969,073, Dec. 13, 1978, abandoned.

[51] Int. Cl.³ .................... G11B 23/04; B65D 85/30
[52] U.S. Cl. .................................. 360/133; 206/441; 360/97
[58] Field of Search .................. 360/132, 133, 97–99, 360/86; 206/444, 303, 309–310

[56] References Cited

U.S. PATENT DOCUMENTS

| | | | |
|---|---|---|---|
| 3,635,608 | 1/1972 | Crouch et al. | 360/133 |
| 3,715,739 | 2/1973 | van Acker | 360/133 |
| 3,882,701 | 5/1975 | Wirth | 206/444 |
| 4,071,862 | 1/1978 | Lathrop, Jr. et al. | 360/97 |
| 4,090,609 | 5/1978 | Rager | 206/444 |

Primary Examiner—Alfred H. Eddleman
Attorney, Agent, or Firm—Wolf, Greenfield & Sacks

[57] ABSTRACT

This invention relates in general to a disc pack cartridge and more particularly pertains to a handle for a single disc cartridge which incorporates an improved mechanism that enables unlatching of the removable bottom cover of the cartridge. An improved manner of mounting the handle on the top cover is incorporated in the assembly to facilitate assembly, simplify the handle structure and make the handle mount more secure.

30 Claims, 36 Drawing Figures

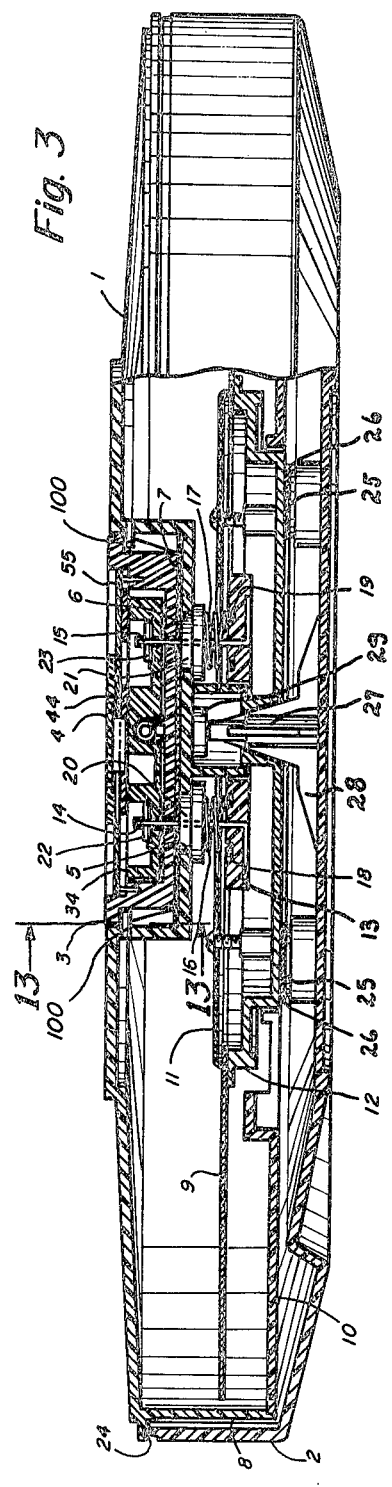
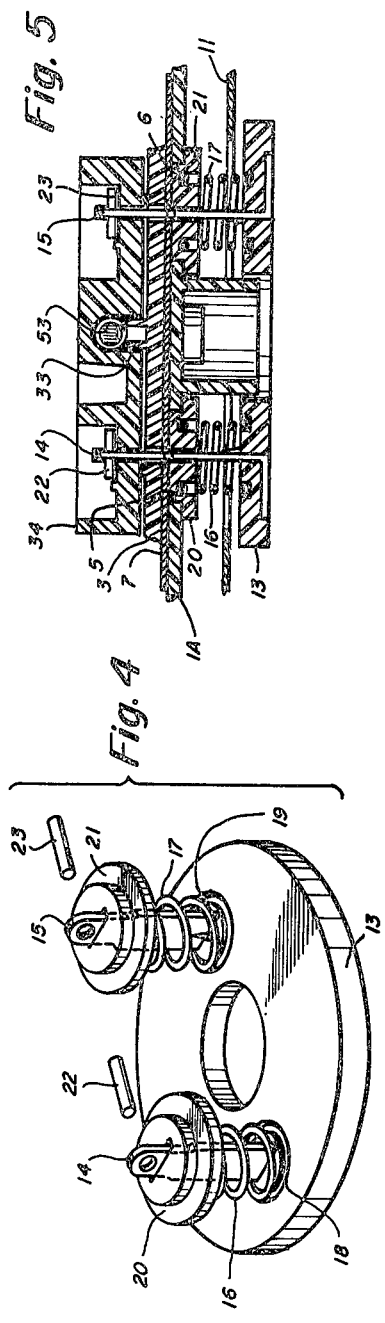

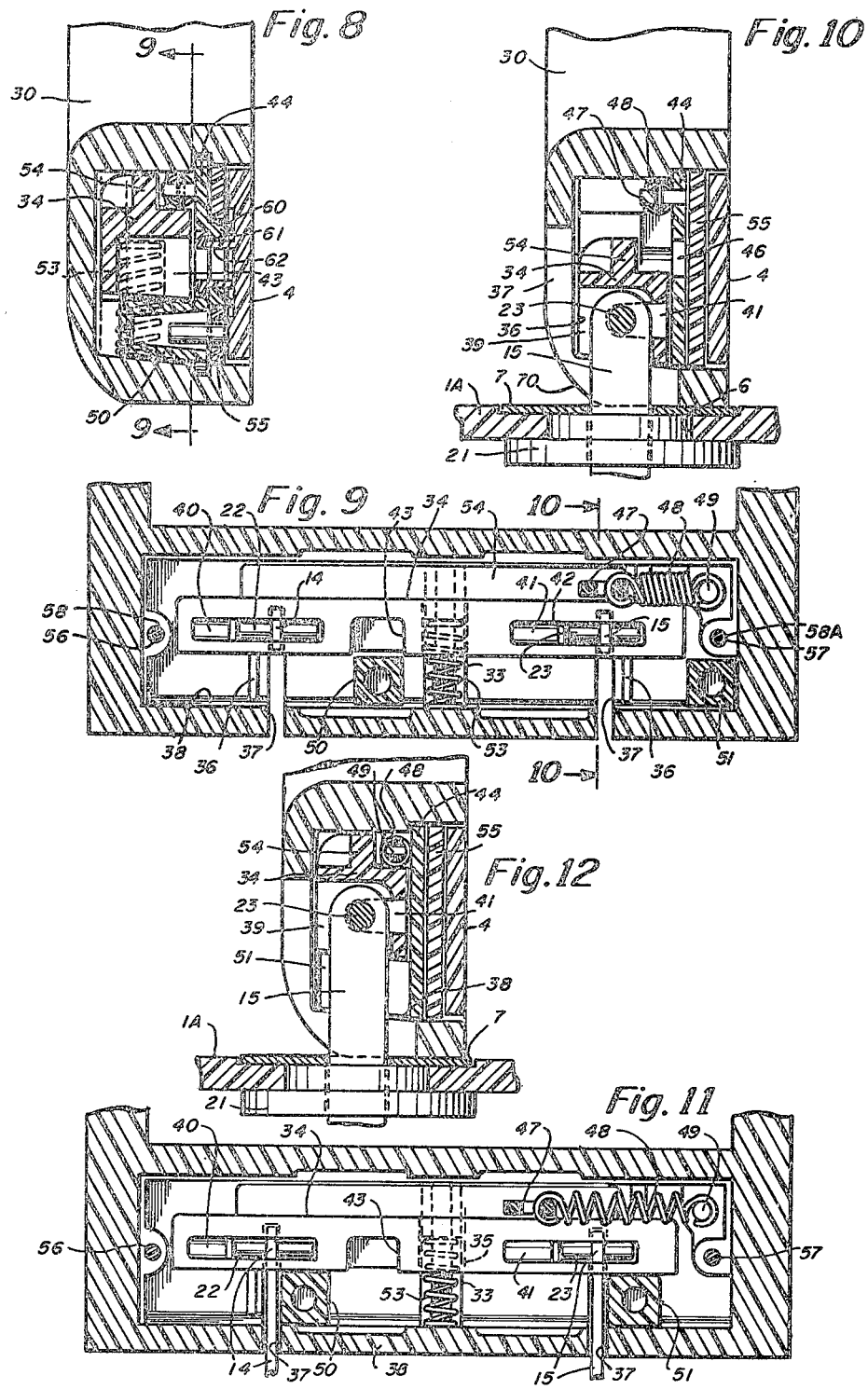

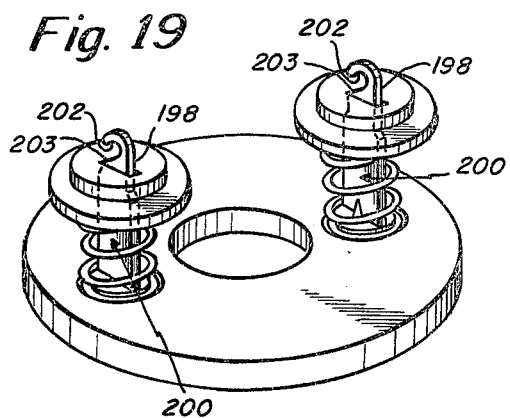
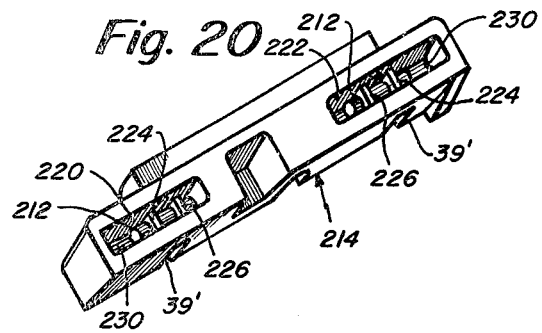
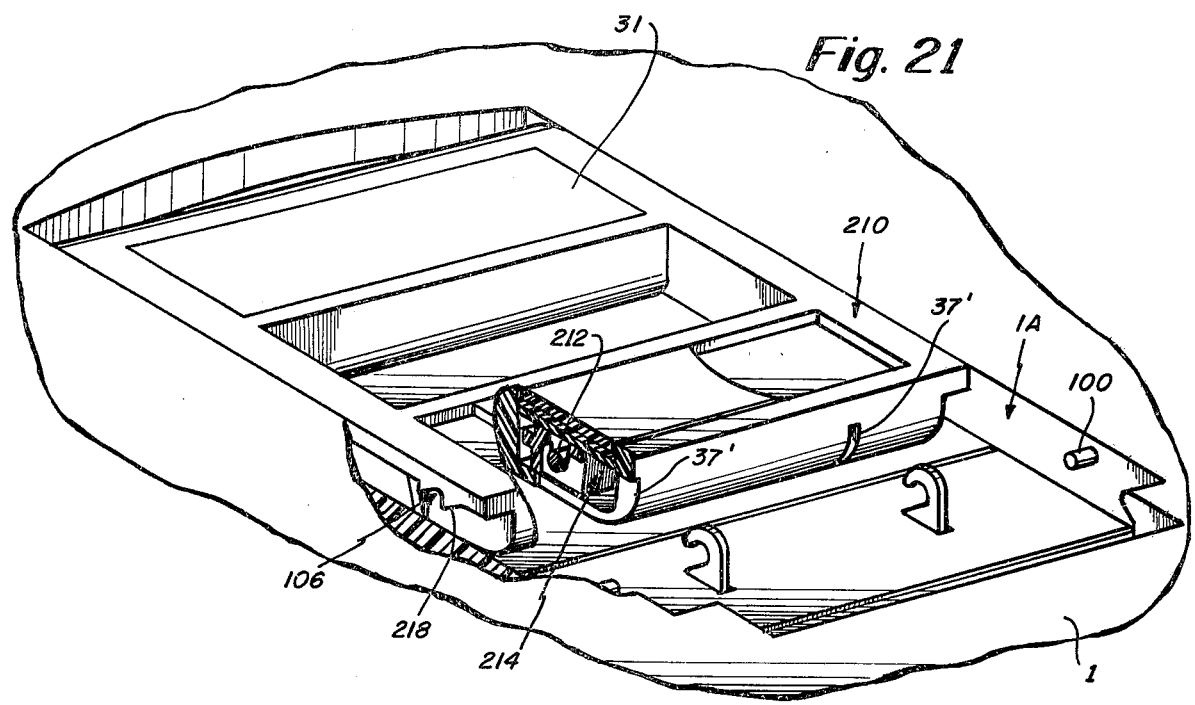
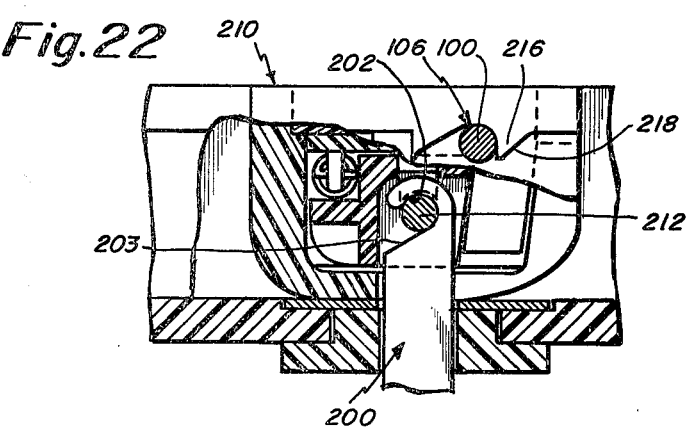

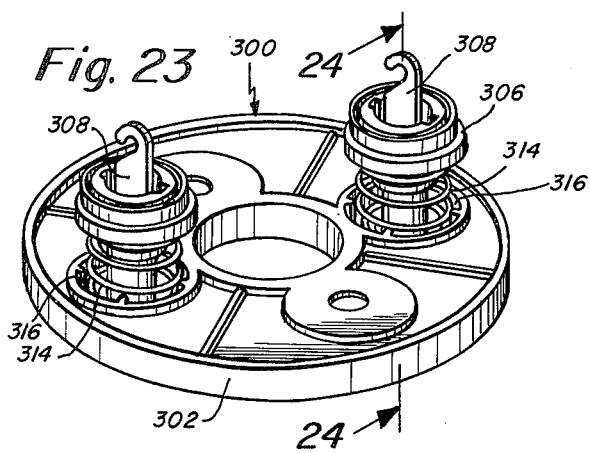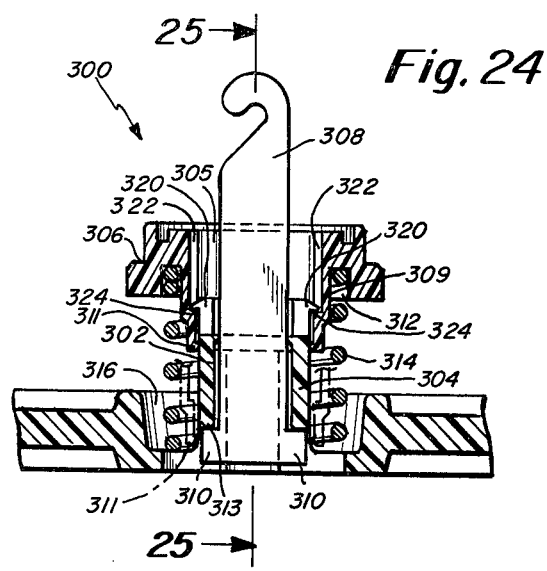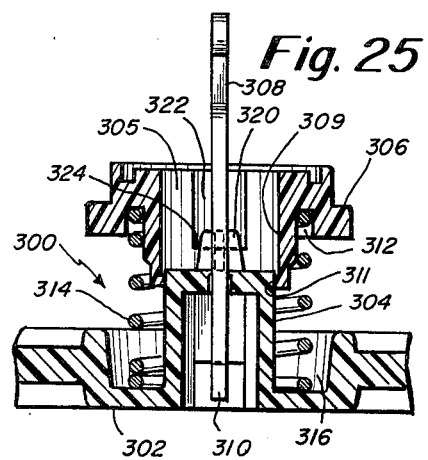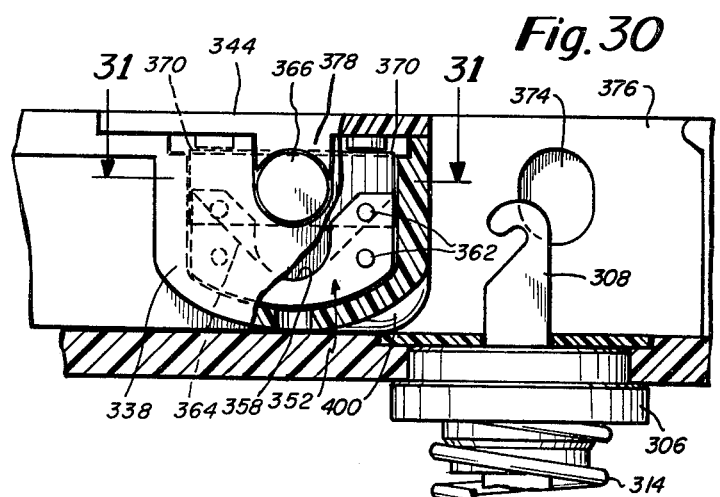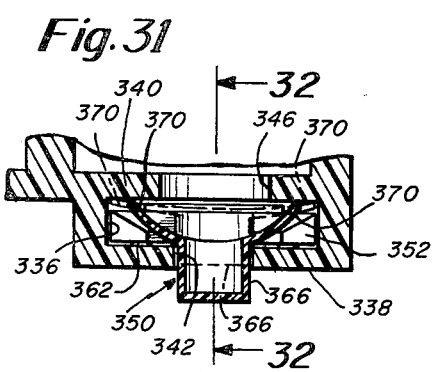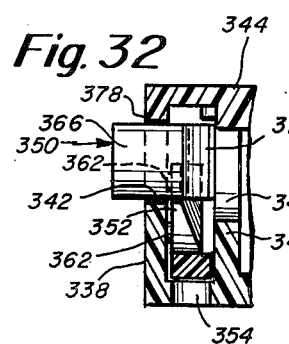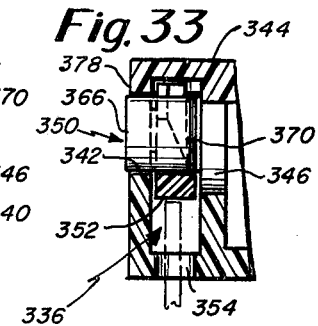

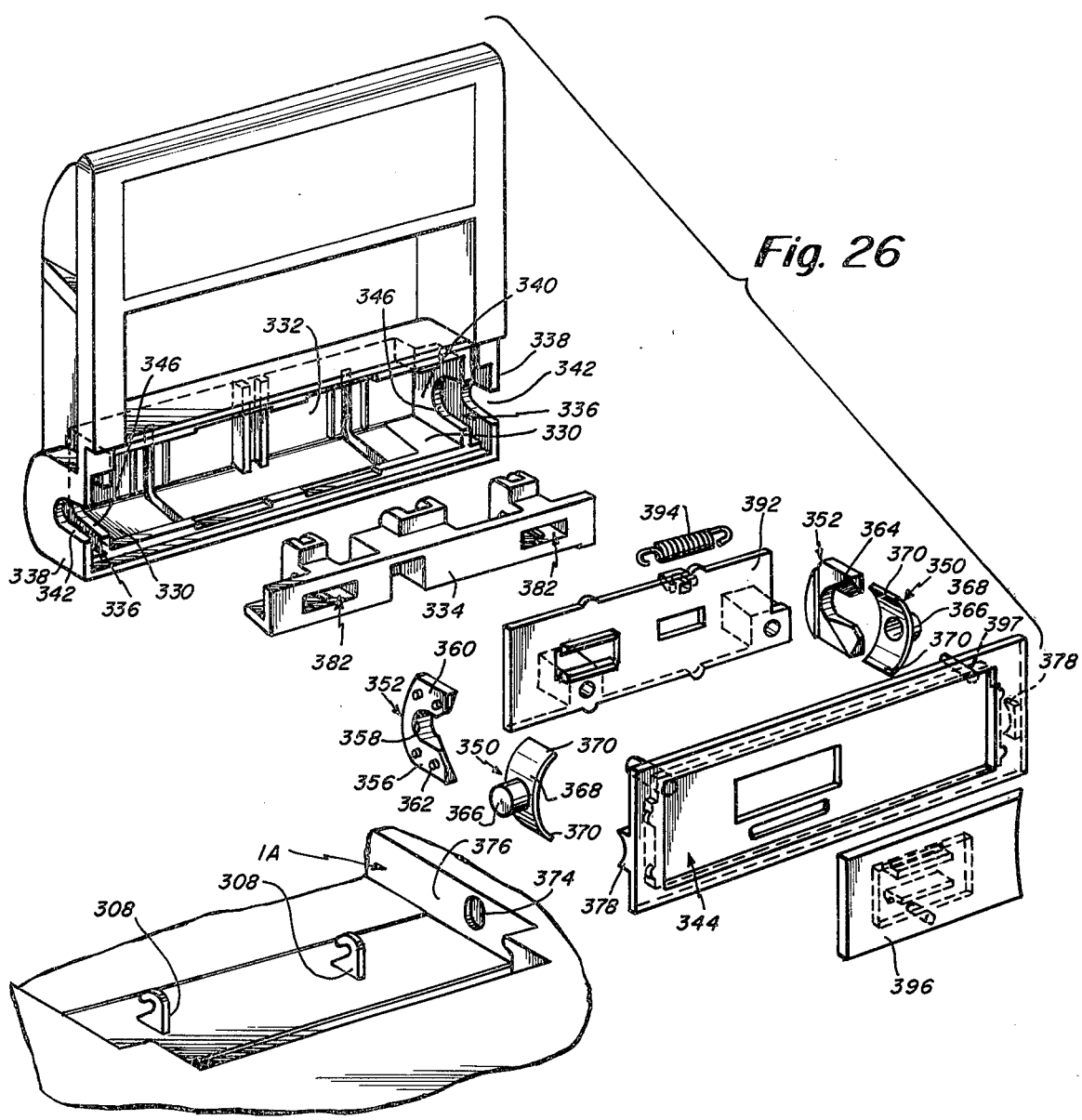
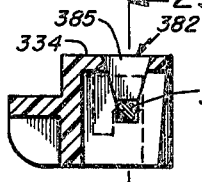
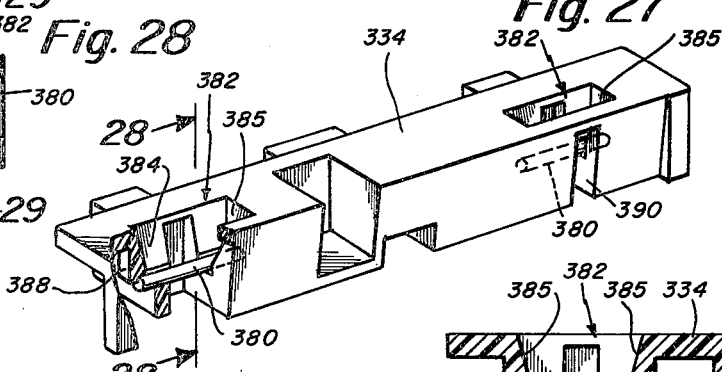
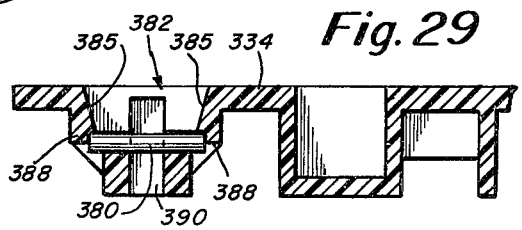

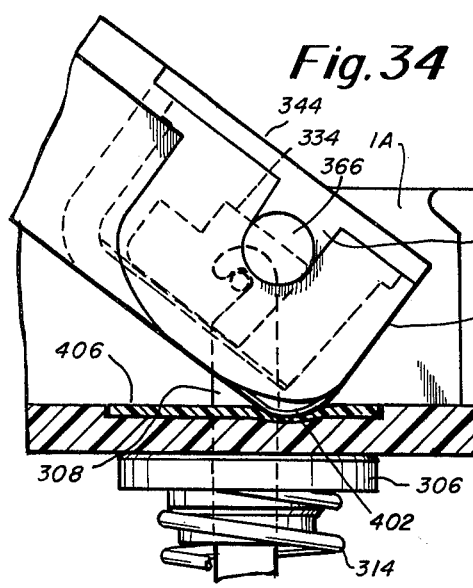
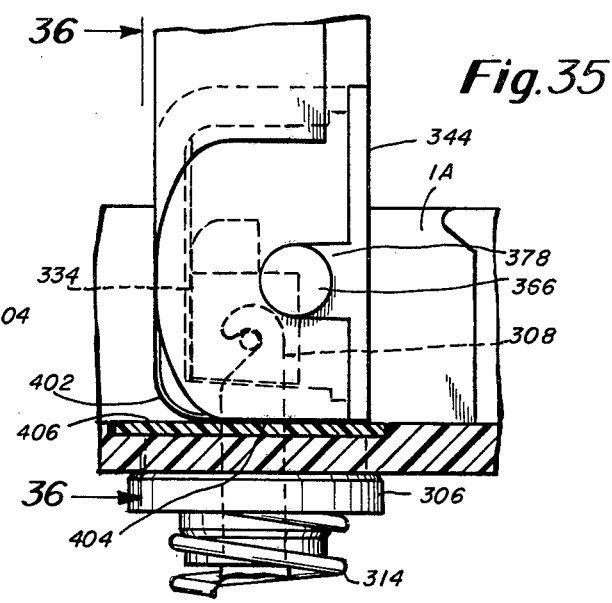
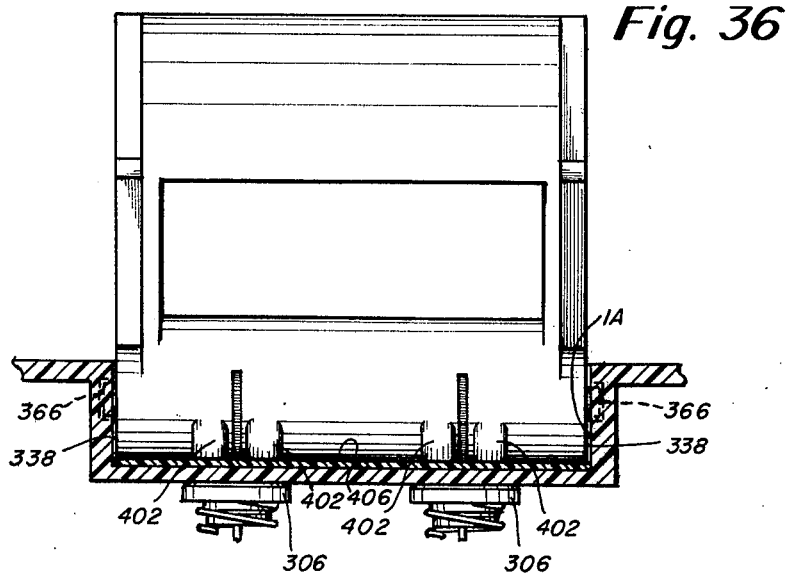

4,355,340

DISC PACK WITH SNAP ON HANDLE

BACKGROUND OF THE INVENTION

This application is a continuation-in-part of my earlier filed application Ser. No. 104,267 filed Dec. 17, 1979 entitled "Snap on Handle for Disc Pack", now abandoned, which in turn is a continuation-in-part of application Ser. No. 969,073 filed Dec. 13, 1978 entitled "Disc Pack Handle Mechanism", now abandoned.

This application is also an improvement over copending application of Butz, et al., Ser. No. 62,139 filed July 30, 1979 also entitled "Disk Pack Handle Mechanism", now U.S. Pat. No. 4,253,129. All of the applications including the present application have a common assignee.

Magnetic discs are widely used in electronic data processing systems for the storage and retrieval of information. To protect the magnetic discs, the discs are enclosed in housings having latchable bottom covers. The discs and their housings are known as disc packs. When it is desired to use a disc, the bottom cover is removed from the housing to enable read/write heads to be brought into close proximity to the information surfaces of the disc while the disc is rotated. In one type of disc pack having but a single disc in it, a handle on the housing top cover is provided to facilitate carrying of the disc pack. The handle includes a mechanism that enables the bottom cover to be unlatched by moving a steel armature away from magnets embedded in the bottom cover.

The mechanisms heretofor employed for unlatching the bottom cover have many diasdvantages. For example, because of their complexities they are expensive to manufacture. Many of the parts of those mechanisms are made of metal and therefore cannot be inexpensively molded of plastic material. In connection with the prior art shown in U.S. Pat. Nos. 3,635,608 and 3,882,701, because the mechanism is not fully confined within the handle, a protective shield must be provided to protect the hand of the carrier and prevent objects from interfering with the mechanism. The handle is also unattractive because so much of the mechanism is exposed. Furthermore, the prior art mechanisms are not wholly reliable. When subjected to mechanical shock the latching mechanisms may slip and cause the discs to crash.

In application Ser. No. 62,139 supra, a guide is incorporated into the cover and handle to control the handle so that when it is raised and lowered, no extraneous motion occurs that may place undesired stresses on the handle mechanism and/or accidently release the magnet latching device. The guide includes pivot pins on the cover that engage V-shaped cam surfaces on the sides of the handle to establish a fixed pivotal axis for the handle during most of its movement between extreme positions, and the handle will not pivot about some extraneous axis that may cause the lift arms to be raised and unintentionally open the latch.

OBJECT OF THE INVENTION

The principal object of the invention is to provide a handle assembly that is simpler in construction, less expensive to manufacture, more dependable in operation and esthetically more pleasing than the handle assemblies heretofore employed.

A more specific object of the invention is to reduce the number of parts in the handle, reduce the stresses that are imposed on certain of the parts, improve the mounting for the handle on the top cover so that it can't disengage and thereby permit the pack to drop, eliminate the need for lubricating the carriage to facilitate its sliding action in the handle, and confine the mechanism wholly within the handle.

Another object of this invention is to enable the handle to be snapped onto the lift plate assembly and eliminate the time consuming operation of inserting separate fastening elements.

THE INVENTION

The invention resides in an improved unlatching mechanism housed in the handle of a disk pack cartridge of the type having a magnetically latched removable bottom cover. To unlatch the removable bottom cover, a hub carrying the magnetic disk is raised away from magnets secured to the removable bottom cover to break the magnetic linkage between the magnets and a magnetizable armature plate attached to the hub. The hub is raised by a lift plate having lift arms extending into a chamber in the handle housing a slidable yoke. The lift arms for pivotally attached to the handle assembly in a manner enabling the handle to be swung from a horizontal position to a vertical position. The yoke is arranged to slide in the handle from an unlatch statin to a carry station upon raising of the handle to its vertical position. Sliding of the yoke to the carry station enables the handle to be raised without lifting the lift arms. Consequently, the removable bottom cover remains magnetically latched. When it is desired to unlatch the removable bottom cover, the handle is placed in its horizontal position and a slide bottom is pushed to place a pair of blocking members in front of the yoke. Upon raising of the handle to its vertical position, the yoke remains at its unlatch station. Consequently, the lift arms are raised as the handle moves to its vertical position and the lift plate pulls the hub away from the magnets of the removable bottom cover. Raising of the lift plate moves the armature plate away from the magnets and so greatly diminishes the magnetic latching force that the removable bottom cover is readily detached.

Preferably the lift arms are provided with hooks at their upper ends, which can slide over and engage connecting pins on the yoke to form the pivotal connection between the handle and the arms. The yoke with the pins is preassembled along with the other parts in the handle, and the fully assembled handle lying flat on the coverslides into place.

In accordance with the preferred embodiment of this invention, openings are provided on each side of the handle, and pivot shafts are coaxially mounted on each side of the handle in the openings. The shafts are biased to a position wherein they extend a maximum distance out of the openings, but forces applied axially against the shafts can force them substantially within the openings. The shafts pivotally support the handle on the cover by extending into elongated slots in the sides of the handle well in the cover. This arrangement provides a very secure support for the handle, eliminates the need for a return spring for the yoke within the handle and makes it easier to mount the preassembled handle on the cover.

BRIEF FIGURE DESCRIPTION

FIG. 3 is a side view of one embodiment of a single disc cartridge of this invention with parts broken away to show the internal arrangement in the assembled unit;

FIG. 4 shows the lift plate subassembly employed in the embodiment of FIG. 3;

FIG. 5 shows the position of the lift plate subassembly of FIG. 4 in relation to the top cover of the cartridge;

FIG. 8 shows the interior of the assembled handle mechanism including the arrangement locking the slide button and slide together to enable them to slide as a unit along the cover plate of the handle;

FIG. 9 is a fragmentary cross sectional view of the handle mechanism taken along section line 9—9 of FIG. 8, with the handle shown in the horizontal position;

FIG. 10 is a fragmentary cross sectional view taken along section line 10—10 of FIG. 9 but with the handle shown in the raised position in the carrying mode;

FIGS. 11 and 12 are views similar to FIGS. 9 and 10 but showing the unlatching mode of the handle;

FIG. 19 is a perspective view similar to FIG. 4 but showing a second embodiment of the invention wherein the preassembled handle may be snapped on the arms of the lift plate assembly;

FIG. 20 is a perspective view similar to FIG. 7 of the yoke or carriage of the second embodiment;

FIG. 21 is a perspective view with parts broken away of the handle assembly in position to be snapped onto the lift arms of the mechanism;

FIG. 22 is a cross sectional view of the handle snapped onto the lift arms;

FIG. 23 is a perspective view similar to FIGS. 4 and 19 and illustrating the preferred preassembled lift plate assembly;

Figure 6:
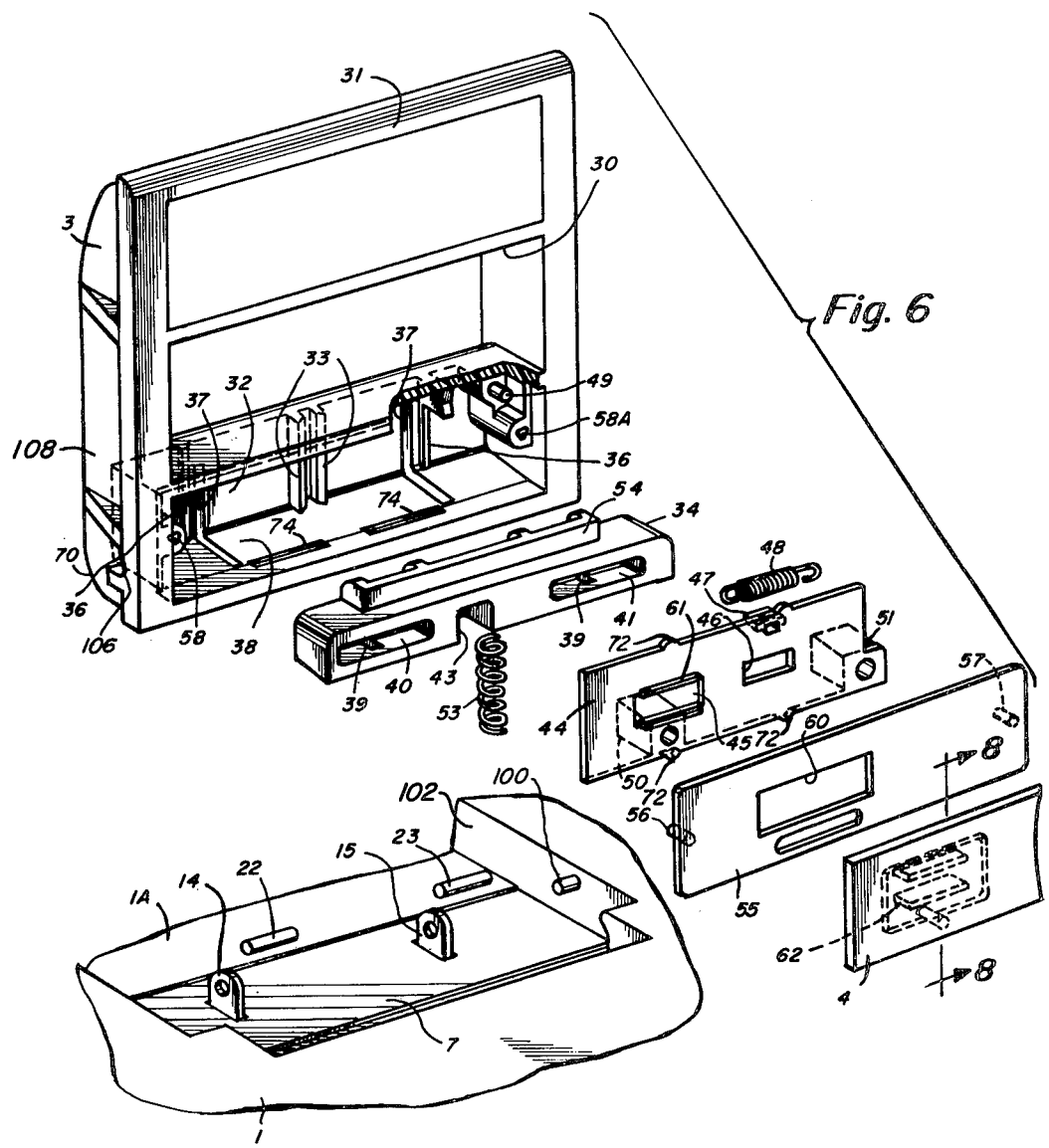
FIG. 6 is an exploded view of the handle assembly of the embodiment of FIG. 3.

FIGS. 24 and 25 are cross sectional views of the preferred lift plate assembly taken on section lines 24—24 and 25—25 in FIGS. 23 and 24, respectively;

FIG. 26 is an exploded view similar to FIG. 6 of the preferred embodiment of handle assembly;

FIG. 27 is a perspective view of the yoke of the assembly of FIG. 26 but rotated counterclockwise 90;

FIGS. 28 and 29 are cross sectional views of the yoke taken along section lines 28—28 and 29—29 in FIGS. 27 and 28, respectively;

FIG. 30 is a fragmentary cross sectional view of the handle of the preferred embodiment in position to be snapped onto the lift arms of the lift plate assembly;

FIG. 31 is a fragmentary cross sectional view of one end of the handle showing the pivot button in the extended position, which supports the handle on the cover, taken along the plane of line 31—31 in FIG. 30;

FIG. 32 is a cross sectional view of the pivot button and cam block taken on section line 32—32 of FIG. 31.

FIG. 33 is a view similar to FIG. 32 but showing the cam block raised to withdraw the shaft of the pivot button required to dismount the handle from the case.

FIGS. 34 and 35 are fragmentary cross sectional views of the handle of the preferred embodiment showing its intermediate and fully raised position on the cover in the handle carrying mode; and FIG. 36 is an elevation view of the bottom of the handle in the raised position taken on sight line 36—36 of FIG. 35.

DETAILED DESCRIPTION

Figure 1:
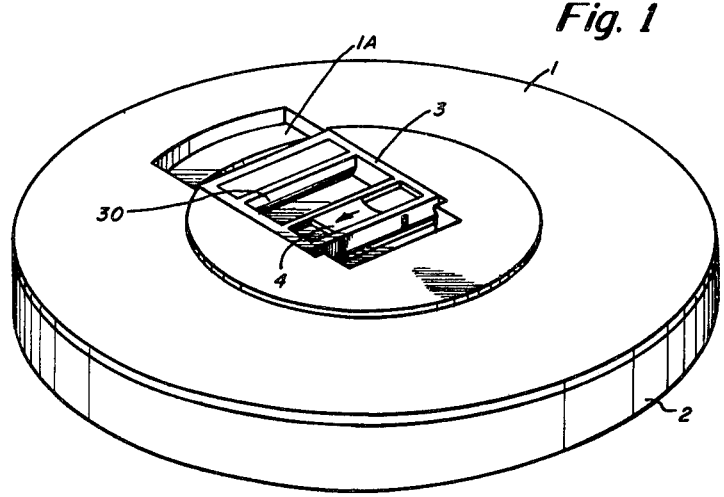
FIG. 1 is a perspective view of a single disc cartridge in accordance with this invention.

The general configuration of a single disk cartridge is depicted in the perspective view of FIG. 1. The cartridge has a circular top cover 1 to which a removable bottom cover 2 is secured by a magnetic latch. Disposed in a well 1A in the top cover is a handle 3 which can be raised to a vertical position. In the horizontal position of the handle depicted in FIG. 1, the handle is flush with the upper surface of the top cover. To unlatch the removable bottom cover, a finger actuated button 4 is slid in the direction of the arrow and the handle is then raised to the vertical position. Upon return of the handle to the horizontal position, the button is automatically restored to its initial station. To facilitate carrying of the cartridge with the removable bottom cover attached, the handle is raised to the vertical position without actuation of button 4.

Figure 2:
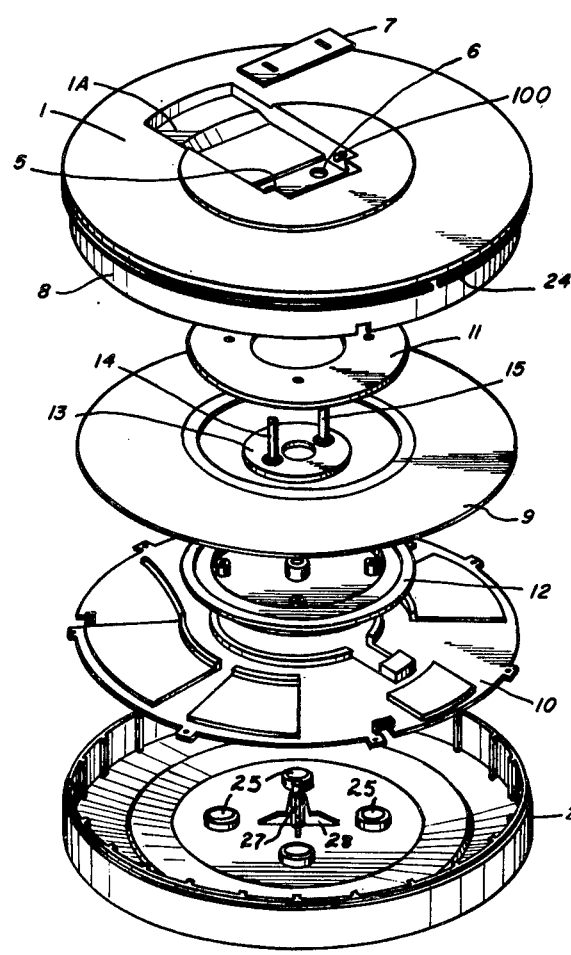
FIG. 2 is an exploded view showing the arrangement within the cartridge.

In the exploded view of the single disk cartridge without its handle depicted in FIG. 2, the top cover 1 has a pair or circular holes 5 and 6 in the well 1A which are covered by a protective plate 7. The top cover has a depending skirt 8 in which there are openings to permit reading and writing heads to be brought into close proximity to the information tracks on the magnetic disk 9. That disk, as best shown in FIG. 3, is disposed within the housing formed by the top cover 1, and a protective cover 10 is secured to the lower edge of skirt 8. The disk 9 can be of the conventional construction which utilizes an annular flat rigid plate of a non-magnetic material such as aluminum that is coated on one or both sides with a magnetizable recording medium. The disk is clamped between an annular clamp plate 11 and a disk hub 12. The annular clamp plate 11 has a downturned rim, and that plate is bolted to the disk hub 12 as indicated in FIG. 3 to cause the downturned rim to engage the inner rim of the annular magnetic disk and clamp the disk against the hub. The annular clamp plate is sufficiently wide so that its inner portion overhangs a depression in the disk hub. Disposed within the depression and captured in it by the overhang of the clamp plate is a lift plate 13.

In FIG. 4 which shows one embodiment of the lift plate subassembly, the lift plate 13 is shown as an annular member having connecting means in the form of a pair of lift arms 14 and 15 protruding through slots in the plate. The lower ends of the lift arms are bent to provide tabs which engage the underside of the plate and lift the plate when the arms 14 and 15 are raised. Surrounding the lift arms 14 and 15 are helical compression springs 16 and 17. To keep the helical springs in position around the lift arms, circular grooves 18 and 19 are provided in the upper side of the lift plate to receive the lower ends of the compression springs. The upper ends of the compression springs are similarly seated in grooves in bezels 20 and 21 disposed at the upper ends of lift arms. The bezels are circular plugs which fit into holes 5 and 6 in top cover 1 as depicted in FIG. 5. To prevent the bezels from being pushed through the holes by the compression springs, the bezels are provided with shoulders that seat against the underside of the top cover. The bezels are provided with slots that enable the lift arms to pass through the bezels and to move up and down relative to the bezels. When the bezels are positioned in openings 5 and 6 in the cover, the bezels align the lift arms 14 and 15 to insure vertical motion of the lift plate assembly. The holes in the top cover are covered by a protective plate 7 having apertures permitting the lift arms to protrude through the protective plate. The upper ends of the lift arms shown in FIG. 4 have bores for receiving pins 22 and 23 that serve as pivotal connections between the lift plate subassembly and handle mechanism to be described presently.

Referring again to the exploded view of FIG. 2 and to the assembled view of FIG. 3, the removable bottom cover 2 has a cylindrical upturned rim dimensioned to fit around the skirt 8 of the top cover. When assembled to the top cover, the edge of the upturned rim of the removable bottom cover seats against aseal 24 to provide a dustproof enclosure for the magnetic disk. As best shown in FIG. 3, the top cover has a peripheral flange providing a groove in which the seal is retained. To keep the removable bottom cover 2 latched to the top cover, the removable bottom cover is provided with magnets 25 that are attracted to an annular armature plate 26 secured to the underside of the disk hub 12. The disk hub is constructed of a non-magnetic material whereas the armature plate is made of a magnetizable material such as steel. The magnets 25 shown and their assembly form the subject of Kaplow, et al application Ser. No. 1,596 filed Jan. 8, 1979, now U.S. Pat. No. 4,233,586.

To enable the bottom cover 2 to be detached, the magnetic attraction between the magnets 25 and the armature plate is broken by moving the disk hub upwardly away from the magnets. The magnets 25 are secured to the bottom of the removable cover 2 and are disposed symmetrically about a central post 27 which is braced laterally by buttresses 28. The top of the central post 27 engages a stub 29 which extends downwardly from the underside of the top cover. Upon raising of the armature plate, the removable bottom cover is prevented from following the upward movement of that plate by the stub 29 which is disposed directly above the central post.

Figure 7:
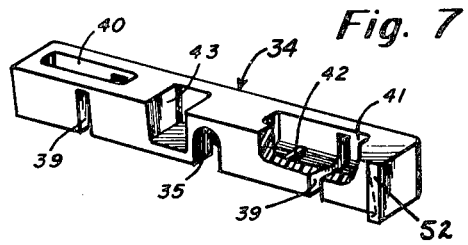
FIG. 7 is a perspective view of the yoke employed in the handle assembly of FIG. 6.

The mechanism for raising and lowering the lift plate is housed in a chamber in the handle 3. An exploded view of one embodiment of that mechanism is depicted in FIG. 6. The handle has a central opening 30 which enables the fingers to curl under and grasp the crossbar 31 which extends between the side members of the handle. The chamber 32 of the handle has a central pair of rails 33 disposed on the chamber's floor. A carriage or yoke 34 is mounted over the rails. As indicated in FIG. 7, the yoke 34 has a central channel 35 in which the rails are received to permit the yoke to straddle those rails. To facilitate sliding movement of the yoke, a pair of ribs 36 may be provided on the floor of chamber 32 to support the yoke. The yoke may slide on the ribs while the rails restrict the yoke to back and forth transverse motion in the handle chamber 32.

A pair of slots 37 extend completely through the floor of the chamber as well as completely through a portion of the chamber front wall 38. Thus in FIG. 6, those slots are depicted as being L-shaped. The slots are of sufficient width to permit the lift arms 14 and 15 to extend through the slots into the chamber.

Referring again to FIG. 7, the carriage or yoke 34 has slots 39 which align with the slots 37 of the chamber when the yoke is positioned in the chamber to straddle the rails 33. The upper ends of lift arms 14 and 15 in the assembled handle are received in the slots 39, and pins 22 and 23 are slid through the bores in those upper ends to lock the lift arms to the yoke while permitting those arms to pivot. The pins 22 and 23 are received in a pair of channels 40 and 41 extended into the yoke. The channels are of sufficient length to permit the pins to be dropped into the channels and then pushed laterally through the bores in the upper ends of the pivot arms. To prevent the pins from being accidentally disengaged from the lift arms, a raised stop is provided in each channel, as indicated in FIG. 7 by the stop 42 in the bottom of channel 41. Thus yoke 34 serves as a carriage in the handle mechanism for the depending lift plate subassembly.

Adjacent to the central channel 35 of the yoke is a receiver aperture 43 which is dimensioned to receive a blocking member carried by the slide 44 (FIG. 6). The slide essentially comprises a control member for the operation of the handle mechanism on the lift plate subassembly. In the assembled handle, the slide is disposed above the yoke 34, and to facilitate assembly of the mechanism the slide is provided with apertures 45 and 46 which can be aligned with the channels 40 and 41 of the yoke to enable the pins 22 and 23 to be dropped into those channels and then moved into engagement with the upper ends of the lift arms. Protruding from the slide 44 is an eye 47 which engages one end of a spring 48 whose other end is anchored to a post 49 in the chamber of the handle. Spring 48 pulls slide 44 to the right as viewed in FIG. 6, and when the slide is at its extreme right station a blocking member 50 which depends from the slide is positioned in alignment with the receiver aperture 43 of the yoke, and the yoke can, consequently, move forwardly toward the front wall 38 of the chamber in the handle. When slide 44 is moved to the left, the spring 48 extends, blocking member 50 is moved out of alignment with the receiver aperture 43 of the yoke, and a second blocking member 51 which depends from the slide is also moved to a blocking position in frong of the yoke. The yoke consequently is blocked from forward movement when the slide 44 is moved to the left, as viewed in FIG. 6. At the extreme right position of slide 44, blocking member 51 is beyond the right edge of yoke 34. To prevent the slide 44 from inadvertently being returned to the right by spring 48, the yoke 34 carries a safety stop 52 which protrudes slightly from the front face of the yoke at its right corner. Thus, when the slide is moved to the left and the handle is raised slightly from its horizontal position, the yoke will be pulled forwardly just enough to enable the safety stop to block the slide from being returned to its right station by the spring 48 should the normal compression friction among the parts fail to do so.

The slide 44 is held in place on handle 3 by the nibs 72 on the side edges of the slide, which fit into the grooves 74 on both sides of handle chamber 32. This allows the handle 3, yoke 34, springs 53 and 48 and slide 44 to be preassembled and permits the handle assembly and lift plate assembly to be shipped separately to the customer who may then conveniently connect the two during the assembling of the disk packs with a minimum of loose parts.

Yoke 34 is biased to its rearward position by a spring 53 which acts to press the yoke against the rear wall of chamber 32. Spring 53 is positioned in the channel 35 of the yoke and between rails 33 so that the spring is compressed by the yoke when the yoke moves forwardly toward the front wall 38. The channel 35 of the yoke has a back wall against which one end of spring 53 seats, and the other end of that spring seats against the front wall 38 of the chamber. At its rear, the yoke has a ledge 54 which is lower than the top surface of the yoke so as to enable spring 48 to extend above the ledge when slide 44 is moved to the left.

Slide 44 and slide button 4 form a unit that slides along cover plate 55. The cover plate, in the assembled handle, is fixed in position and for that purpose carries pins 56 and 57 which are inserted in receptacles 58 and 58A in the housing. The receptacles 58 and 58A are shown in FIG. 6 inside the chamber 32. The cover plate 55 has a longitudinal aperture 60 which enables the slide button 4 to engage the slide 44.

Extending upwardly along the longitudinal edges of opening 45 of slide 44 are a pair of flanges 61 which are best shown in FIG. 8. The flanges extend through the opening 60 of cover plate 55 and have sloping faces which are undercut at their lower ends. Slide button 4 has a pair of downwardly depending snap legs 62 which have sufficient resiliency to fit between the sloping faces of the flanges and provide a snap fit with the slide. To keep the button and slide locked together, the snap legs have barbs which extend into the undercuts of the flanges. To enable the button to be pried off, the barbs of the legs have slanted facets. In assembling the sliding unit about the cover plate, the cover plate is placed over the slide 44 with the flanges extending through the aperture 60 of the cover plate. Button 4 is then pressed down to cause the snap legs 62 to snap into engagement with the flanges. The slide button and slide can then be moved as a unit along the cover plate. The slide button is sufficiently long to cover the aperture 60 in the cover plate even at the extreme limits of movement of the sliding unit.

In FIGS. 9 and 10, the slide is at the station where blocking member 50 is aligned with the aperture 43 of yoke 34, and blocking member 51 is out of the path of forward movement of the yoke. Upon lifting of the handle to the raised position of FIG. 10, the yoke slides forwardly within the chamber 32 against the bias of spring 53 without raising the arms 14 and 15 enough to lift the armature plate away from the magnets or the removable lower cover. Consequently, the removable bottom cover remains magnetically latched.

In the unlatch mode depicted in FIGS. 11 and 12, the slide has been moved to position blocking members 50 and 51 in front of yoke 34. Upon lifting of the handle, the yoke is prevented from sliding within the chamber by the blocking members, and consequently, as the handle is raised, the lift arms 14 and 15 are pulled upwardly and raise the armature plate away from the magnets on the removable bottom cover and thereby unlatch the removable bottom cover.

The mechanism described in detail above depends upon the proper sliding movement of yoke 34 in the handle cavity for proper operation. Should the yoke not slide in the intended fashion within the handle when the handle is moved between its horizontal and vertical positions, the magnetic latch could unintentionally open so as to cause the bottom cover accidentally to drop from the rest of the disc pack assembly. For example, if the handle is raised to the vertical position but the yoke 34 for some reason does not slide to the front of the handle cavity then the bottom cover would be released and if unsupported would fall from the disc pack. On the other hand, if the handle in the vertical position and in the carrying mode is returned to the horizontal position and for some reason the yoke does not slide to the rear of the handle cavity, it would not, thereafter, be possible to move the slide so as to unlatch the magnetic latching device when the handle is again elevated.

In accordance with the invention disclosed in application Ser. No. 62,139 supra, to establish a precise path of travel for the handle when it is moved between the raised and lowered positions and to provide greater rotational rigidity for the entire handle assembly so as to insure proper operation of the latching mechanism, a pair of pins 100 are mounted on the side walls 102 of the well 1A in top cover 1, which pins are axially aligned with one another and register with V-shaped notches 106 that define cam surfaces provided in the sides 108 of handle 3. The pins and notches are shown in FIGS. 6 and 13–18. In FIGS. 13 through 18 the effect of the pins and slots on the course of movement of the handle is illustrated.

Figure 13:
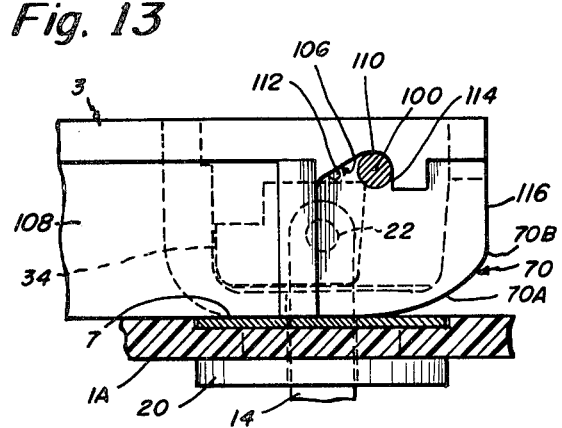
FIGS. 13 to 18 are fragmentary cross sectional views of the handle showing the series of positions assumed by the handle as it moves from the horizontal, stored position to the raised, verticalf, carrying position without unlatching the magnetic latch.
Figure 14:
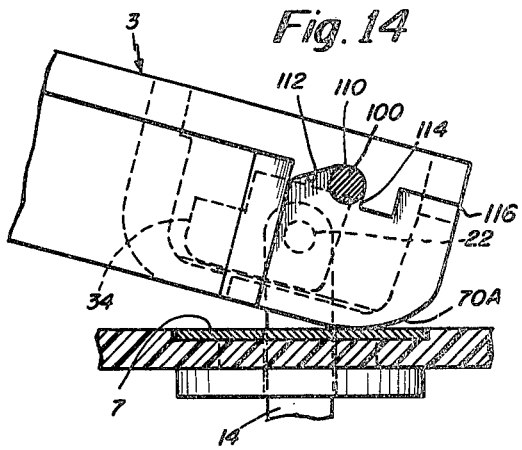
Figure 15:
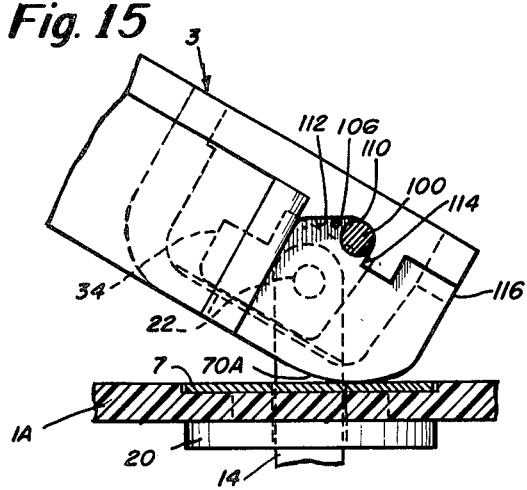

In FIG. 13 lift arm 14 is shown extending upwardly into the handle cavity and is anchored to yoke 34 by pin 22. The pin 100 on the side wall of the top cover well 1A is shown disposed in the crotch 110 of the notch 106. It will be noted in FIG. 13 (as well as in FIGS. 14 through 18), that notch 106 is defined by converging inclined substantially straight wall section 112 and vertical wall section 114, and the rounded crotch section 110 which is substantially tangent to the tops of wall sections 112 and 114. As the handle moves from the horizontal position shown in FIG. 13, through the positions shown in FIGS. 14 and 15 to the position shown in FIG. 16, the handle pivots about the fixed axis of pin 100 as the axis of the pin 100 remains in fixed relationship to the notch 106. At the same time, the lower front corner 70 of handle 3 slides on the protective plate 7. The configuration of the corner 70 is such that as the handle is raised, the corner defines a ramp that slides on the surface 7 and acts as a wedge so as to cause the handle itself to exert a lifting force on the yoke which in turn transfer that force as a pull upon the arm 14 (and 15). Because of the flatness of the corner 70 particularly at its leading end 70A, the handle slides smoothly on surface 7 and does not form an independent pivot point for the handle which would cause the pin 100 to slide on wall section 112 of notch 102.

Figure 16:
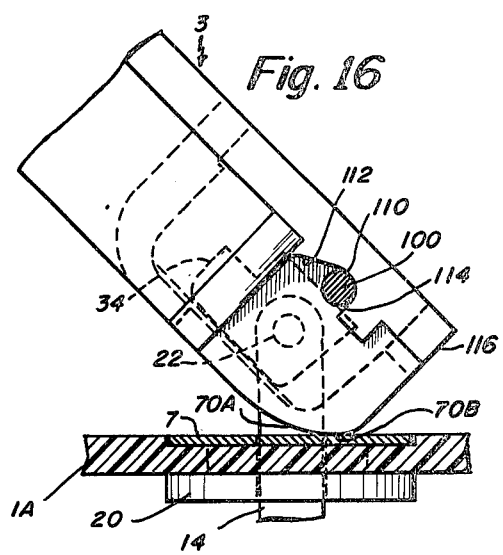
Figure 17:
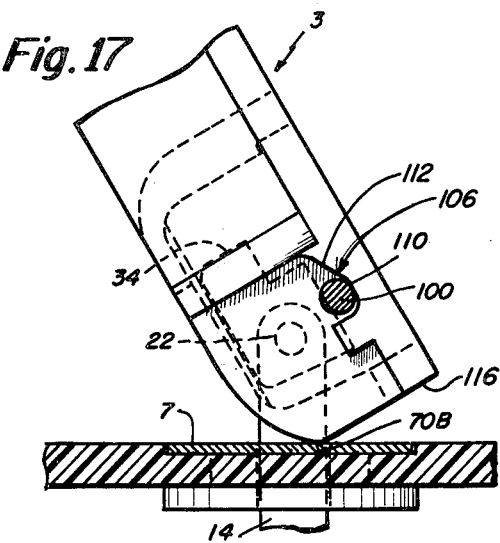
Figure 18:
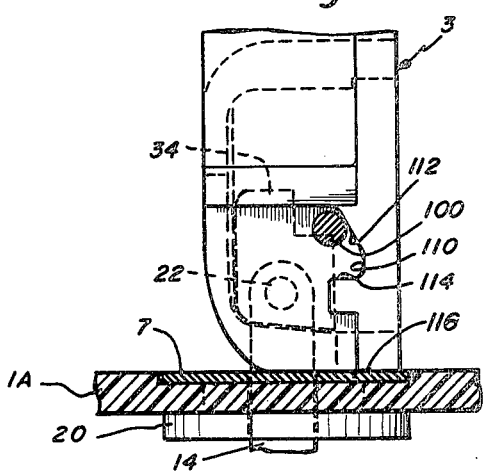

With the handle in the position shown in FIG. 16, the axis of pin 22 supporting arm 14 reaches its maximum elevation above surface 7, and with continued movement of the handle through the position shown in FIG. 17 to the vertical position shown in 18, the axis of pin 22 drops slightly toward surface 7. The movement of the lift arm 14 is not sufficient to cause the lift plate 13 to raise the hub 12 and armature 26 so as to open the magnetic latch. In the actual disc pack tested, a lift of the arms 14 and 15 of 0.160 inch was required to release the latch, and the axis of pin 22 is raised a maximum of only 0.082 inch when the slide 44 is in the inactive position.

Referring again to FIG. 16, it will be noted that as the axis of pin 22 reaches the maximum elevation above surface 7, the trailing portion 70B of corner 70 is in contact with the surface 7, and its slides beneath the axis of pin 22 until the flat front side 116 of handle 3 rests on surface 7. As the handle moves from the position shown in FIG. 16 through that of FIG. 17, to the position of FIG. 18, the pins 100 slide up the inclined wall sections 112 of V-shaped notch 102 so as to allow the front end 116 of the handle to rest on surface 7.

The pin and V-shaped cam notch that join the handle 3 and the top cover provide greater rotational rigidity for the handle to insure that the handle follows a prescribed path so as not to accidentally either unlatch the pack or prevent it from being unlatched after the handle has been once placed in the carrying position. The large radius at the handle corner 70 facilitates the sliding of the handle on the surface while the smaller radius at the trailing edge of the corner blends the large radius section 70A with the flat end wall 116. As a result, more dependable action occurs under the influence of spring 53 which moves the yoke to the rearward position when the handle is elevated, so long as the slide has not been placed in the active or unlatching position.

In accordance with the preferred embodiments of this invention, the handle is preassembled and thereafter connected to the lift plate assembly by merely sliding it into position on the cover. In order to accomplish this, certain modifications must be made in the embodiment of FIGS. 1-11 heretofore described. One improved embodiment is shown in FIGS. 19-22 wherein the modifications are confined to the yoke, the V-shaped cam slots and the lift arms. The other parts of the assembly remain essentially the same.

The first change resides in the configuration of the lift arms as shown in FIGS. 19 and 22. The tops 198 of the lift arms 200 are provided with hooks 202 which are open in a direction facing the crossbar or gripping portion 312 of the handle, rather than holes as in the first embodiment. The lower margin of the hooks 202 are defined by upwardly and forwardly inclined ramps 203. The hooks are designed to slide into the handle 210 through slots 37' and engage the pins 212 carried by the handle yoke 214 as is described in greater detail below.

A second feature of this embodiment resides in the configuration of the front side 216 of the V-shaped notch 106 as shown in FIGS. 21 and 22. The front side 216 of the notch shown is provided with a ramp 218 that allows the handle to slide forward and up on the pins 100 until the pins clear the side 216 and enter the notch, and the handle returns to the lower position on the bottom wall of the well 1A of the cover.

A third feature of this embodiment resides in the configuration of the yoke 214 and the manner in which the pins 212 are retained in it. As shown in FIG. 20, the yoke 214 is provided with a pair of channels 220 and 222 in its upper surface, and each channel is bridged by a pair of retaining fingers 224 and 226 on each side that may be molded as an integral part of the yoke 214. The fingers 224 and 226 are provided to retain the pins in the channel by engaging their upper sides. The length of each channel on one side of the fingers exceeds the length of the pins as shown at 230, so that the pins may be dropped into the channels and then be slipped along the channel bottom walls below the fingers until they are firmly engaged.

In accordance with this embodiment, the entire handle including the yoke 214, spring 53, slide 44, spring 48, cover plate 55, control button 4 and pins 211 may conveniently be preassembled and the top cover 1 may be placed upon the lift arms with the hooks facing the slots 37' as shown in FIG. 21. With the handle lying flat in the well 1A of the cover, it may be slid in the direction of the hooks, and the hooks will pass through the slots 37' in the handle and the slots 39 in the yoke until the hooks 202 capture the pins. The ramps 218 on the cam sides 216 allow the handle to slide in the manner described without interference from the pins 100 on the sides of the handle well 1A.

In the preferred embodiment of this invention shown in FIGS. 23-36, improved means for providing greater rotational rigidity and dependable operation of the latching mechanism are provided. The handle mechanism is also easier to assemble, the yoke return spring is eliminated, and the handle is more secure. These improvements are achieved by changes in the lift plate assembly, the pivotal support of the handle on the cover, the anchor for the slide return spring, and the details of the yoke.

In FIGS. 23-25 the improved lift plate assembly 300 is shown to include a lift plate 302 molded with a pair of upstanding cylindrical columns 304 that are slidably received in the cylindrical openings 305 in the bezels 306. Lift arms 308 mounted in the columns 304 have flanges 310 at the bottom that engage the column bottoms so as to prevent the arms from being pulled out the column tops.

The bezels 306 have downwardly facing channels 312 in their lower surfaces which receive the upper ends of springs 314, and the lower ends of the springs are seated in the troughs 316 that surround coumns 304. The bezels are retained on columns 304 by barbs 320 formed on the tops of the columns. As is shown in FIG. 24, the barbs 320 slide in vertical channels 322 in the sides of the openings 305 in the bezels, and the lower ends of the channels define shoulders 324 that engage the barbs to limit the action of the springs 314. With this arrangement, the lift plate subassembly can be preassembled without the aid of the pins which secure the lift arms to the yoke in the handle chamber. It will of course be noted that the arms 308 have the same hook and ramp arrangement as the embodiment of FIG. 19 to enable the handle to be slipped into place.

Each bezel 306 also has a cylindrical inner sleeve 309 that surrounds the lift plate columns 304 within the spring 314, and the lower end of each sleeve has a flange 311 that closely engages a column to form a seal that prevents dust or other particles from reaching the interior of the pack from the handle well when the cover closes the disc pack. While the flanges 311 normally form the seals about the columns, the seals are broken when the lift plate 302 is raised to its maximum height with respect to the bezels. That is, when the magnetic latch of the disc pack is open the flanges 311 of the sleeves lie below the lower end 313 of the columns opposite the edges of the arms 308, as suggested in broken lines in FIG. 24. This position of the flanges 311 opens air passages about the columns so as not to interfere with the return of the lift plate to its lower position when the handle is moved to the horizontal position in the cover.

In FIGS. 26 and 31-33, the handle is shown to have a different arrangement from that shown in FIGS. 13-18 for pivotally supporting the handle in the well 1A of the cover. Beyond the ends 330 of handle chamber 322 that receives yoke 334 are small cavities 336 defined by outside walls 338 and inner walls 340. The outer walls 338 are provided with U-shaped slots 342 that extend to the top of the walls so as to provide access to the slots when the cover 344 for chamber 332 is removed. The slots 346 in the inner walls 340 are provided for molding convenience and do not play any part in the operation of this invention.

Each of the cavities 336 houses a pivot button 350 and a cam block 352, and a hole 354 is provided in the bottom of each cavity for reasons which will become clear presently. Each cam block 352 is in the form of a "U" rounded at its bottom to conform with the round bottom of the cavity 336. The arms 356 of the cam block define a slot 358 that mirrors the slot 342 in outer wall 338. The outer face 360 of the cam block which rests against the inner surface of outside wall 338 has nibs 362 that enable it to slide freely on that surface while the inner surface 364 tapers upwardly along the margins of the slot 358 to serve as a cam to deflect the base of pivot button 350 in the manner described below.

Each pivot button 350 comprises a hollow stub shaft 366 and a base 368 composed of a pair of thin, flexible arms 370 extending outwardly and rearwardly from opposite sides of the shaft 366 in an arcuate path as is shown in FIG. 26. As is shown in FIGS. 30–32, when the pivot button 350 is assembled in the cavity 336, the arms 370 of base 360 lie inside the arms 356 of the cam block with the lower margins of the arms 370 lying against the tapered surfaces 364. The stub shaft 360 extends through the slot 358 in the cam block and the slot 342 in the outer wall 107 of the cavity. The stub shafts 366 on opposite sides of the handle, which extend out of the cavities 336 through slots 342, support the handle in the cover well 1A when the pack is assembled, as the shafts extend into elongated slots 374 in the sides 376 of the cover well.

The cover 344 for the handle chamber 332 extends over the closes the tops of the cavities and retains the cam blocks and pivots buttons in place in them. The cover is provided with short flanges 378 at its opposite short edges, which are aligned with the slots 342 in the side walls 338. The lower edge of each flange 378 is provided with a radius that conforms to the curvature of the bottom of slot 342 so as to form a circular opening for the stub shaft 366. Therefore, when the cover 344 is in place on the handle, the pivot button is essentially confined to a fixed level within the cavity 336, but its shaft is capable of moving axially in the circular opening.

The holes 354 in the bottoms of the cavities enable a tool to be inserted into the cavities and engage the bottoms of the cam blocks as suggested in FIG. 33. When the cam block 352 is pushed upwardly in the cavity 336, the cam surfaces 364 of its arms 356 bear against the outer (convex) surfaces of the arms 370 of the pivot button to withdraw the stub shaft 366 inwardly within the confines of the cavity and out of the elongated slot 374 provided in the wall 376 of the cover well. It will be appreciated that the beveled cam surfaces 364 of the cam block enable the arms 356 to climb upwardly over the arms 370 of the pivot button base so as to collapse the arms and thus flatten them to pull the stub shaft axially inwardly to the interior of the cavity. This action is used to disassemble the handle assembly from the cover. It will also be appreciated that when the handle is to be remounted on the cover, the stub shafts may manually be pressed into the cavities 336 to slip the handle assembly in the cover well 1A in preparation for attaching the handle to the lift plate assembly arms 308.

The modification of the yoke 334 resides in the technique for retaining the pins 380 in the wells 382. As is evident in FIGS. 27–29, the wells 382 have downwardly converging side and end walls 384 and 385, and the length of each well is slightly shorter than the length of each pin 380. The pins are mounted in place by dropping them into the wells and forcing them by the lower margins of end walls 385 into the seats provided on the well bottoms. Once in place, the pins will remain in the seats and they cannot slide axially off the seats because of the stops 388 provided at each end. When mounted in place, the pins bridge the slots 390 in the yoke, which receive the arms 308 of the lift plate assembly.

In accordance with the preferred embodiment, the yoke and the pins are preassembled and thereafter mounted in the handle chamber 332, and pivot button 350 and cam block 352 are mounted in the cavities 336. Thereafter slide 392, slide return spring 394, cover 344 and slide button 396 as a unit are also secured in place to complete the handle assembly. Yet another improvement incorporated into the preferred embodiment is the change in the mounting of the slide return spring 394 that enables the slide 392, spring 394, cover 344 and slide button 396 to be preassembled. In FIG. 26 it will be noted that while one end of the spring 394 is secured to the slide 392 in the same fashion as employed in the embodiment of FIG. 6, the other end of spring 394 is secured to a post 397 carried by cover 344 rather than a post in the handle well as at 49 in FIG. 6. This arrangement allows slide 392, cover 344, slide button 396 and spring 394 to be preassembled and secured in place on the handle as a unit after the yoke subassembly, pivot 350 and cam block 352 are mounted in the handle.

The lift plate assembly shown in FIGS. 23–25 is also preassembled. Thereafter the lift plate is placed beneath the cover with the arms 308 extending upwardly into well 1A as shown in FIG. 30 and the pivot buttons are compressed so that the handle can be placed flat in the well. With the parts positioned as shown in FIG. 30 the handle is then snapped into position by sliding the handle forward (to the right) until the hooks of the arms engage the pins 380 in the yoke. As the handle is snapped into position, the shafts 366 of the pivot buttons align with the openings 374 and snap out of the cavities 336 to establish a pivotal axis for the handle.

To remove the handle and disassemble the cover, the handle is pivoted to the vertical position and a thin implement is inserted into the holes 354 in the bottom of the cavities 336 to raise the cam blocks, as suggested in FIG. 33. This action flattens the arms 370 of the base of the pivot buttons to withdraw the shafts 366 from the slots 374. The handle may then be slid rearwardly in well 1A to remove the pins 380 from within the hooks of the arms 308 of the lift plate assembly.

An additional feature of the preferred embodiment is shown in FIGS. 30 and 34–36. In those figures it will be noted that the bearing edge 400 of the handle, about which the handle generally turns in the well 1A of the cover, carries four bosses 402 which effectively widen the flat front face 404 of the handle. These bosses, as shown in FIG. 36, provide a more stable platform for the handle when it is raised to the position of FIGS. 35 and 36. When the handle is raised from the horizontal to the vertical position and passes through the position of FIG. 34, the bosses temporarily deform the protective plate 406. When the handle is fully elevated, the bosses lie on top of the plate and stabilize the handle. The slifht elongation of the slot 374 accommodates the vertical motion of the handle, which is increased by the bosses 402.

From the foregoing description many of the advantages of this invention will be apparent. For example, all of the mechanism for controlling the actuation of the lift plate subassembly is hidden within the handle. The mechanism is also very reliable, and substantially eliminates the possibility of accidental release of the lift plate subassembly and subsequent crashing of the disc against the equipment on which the pack is used. This is achieved by virtue of the intrinsically produced and constantly maintained frictional force between the yoke and the blocking members carried on slide when the slide is in the left side of the handle chamber. In the embodiments of FIGS. 1-22 the springs 16 and 17 on the lift plate subassembly exert a very much greater pull through the arms 14 and 15 on the yoke to move it toward the front wall 38 of the handle chamber and against the blocking member than the counterdirectional force exerted by spring 53 against the yoke. In addition, the stop 52 on the right end of the yoke which moves behind the right end of the blocking member 51 on slide 44 prevents the slide from moving to the right when the handle is raised even if the pack is subjected to substantial mechanical shock. When the handle is returned to the horizontal position, spring 48 automatically returns the slide to the right or nonblocking position. The ease of assembly of the handle and lift plate mechanisms particularly in the preferred embodiment also provides substantial benefits. The absence of screws in the product eliminates the possiblity of not properly bottoming the screws during assembly, of screws later becoming loose, and of cross threadings and resulting damage to the parts. And of course no power driver is needed to assemble the mechanisms. The disc pack assembly of this invention is also free of expensive metal stampings and machined parts which are found in the prior art. The few metal parts are all simple and relatively inexpensive. All of the foregoing advantages are achieved without altering the manual operations required of the end user.

The preferred embodiment of the invention shown in FIGS. 23-36 also makes the handle particularly secure. The pivot buttons and cooperating slots in the slide walls of well 1A establish a fixed path for rotation of the handle which virtually eliminates any chance of the locking mechanism malfunctioning. The elimination of the yoke return spring found in the other embodiments does away with the careful balanced required of that spring. The spring must be strong enough to force the handle to its rest position when the handle is lowered and weak enough to allow the yoke to slide in the chamber when the handle is raised and the blocking mechansm is inactive. Further, bending moments imposed on the yoke by the springs are reduced and any tendency of the yoke to bind on the rails is eliminated. Consequently the need of lubricating the yoke is eliminated. In addition, the assembling of the handle is much easier in that the pivotal supports for the handle are readily retracted to enable the handle to be slipped into place. Another advantage of the preferred embodiment is that the handle rotates substantially on a fixed axis so that any tendency for the handle to twist is eliminated.

It will also be appreciated from the foregoing description that many changes may be made in this invention without departing from its spirit. Therefore, it is not intended to limit the breadth of this invention to the specific embodiments illustrated and described. Rather, it is to be limited only by the appended claims and their equivalents.

What is claimed is:

1. In a disc pack cartridge of the type having a top cover with a handle that can be raised from a horizontal position to a vertical position, a magnetic disc housed within the top cover, the magnetic disc being attached to a hub having a magnetizable armature plate, a removable bottom cover having magnets for latching the removable bottom cover to the top cover by the magnetic attraction between the magnets and the armature plate, a lift plate for lifting the hub away from the magnets of the removable bottom cover to unlatch the removable bottom cover, and lift arms attached to the lift plate and extending through the top cover into a chamber in the handle, the improvement comprising a yoke constantly housed in the chamber of the handle for sliding movement between an unlatch position and a carry position, means securing the lift arms to the yoke in a manner enabling the lift arms to pivot on the yoke, means urging the yoke to the unlatch position, a slide member in the chamber, disposed above the yoke, the slide member having dependent blocking members adapted to block sliding movement of the yoke from the unlatch position toward the carry position, the slide member being movable to a carry station where the dependent blocking members do not block the sliding movement of the yoke.

2. The improvement according to claim 1 wherein the yoke has a receiver aperture therein situated to receive a blocking member when the slide member is at its carry station, the means securing the lift arms to the yoke are pivot pins extending through the upper ends of the lift arms, and the yoke has longitudinal channels therein for receiving the pivot pins.

3. The improvement according to claim 2 wherein a cover plate covers the chamber of the handle, the cover plate being adjacent to the slide member and secured to the handle, the cover plate having an elongated aperture therein, and a slide button, the slide button having dependent means adapted to protrude through the elongated aperture of the cover plate and engage the slide member whereby the slide button and the slide member are movable as a unit along the elongated aperture of the cover plate.

4. The improvement according to claim 3 wherein resilient means in the chamber urge the slide member to its carry station.

5. A disc pack handle and latching assembly comprising:

a cover having a handle on its upper side that can be raised from a horizontal position to a vertical position on the cover, a lift plate disposed below the handle on the bottom side of the cover for carrying an armature forming part of a magnetic latching assembly for connecting the cover to a base of the pack, a chamber within the handle and connecting means secured to the lift plate and extending into the chamber, a yoke constantly confined to the chamber, pivot means within the chamber pivotally connecting the connecting means to the yoke, and control means on the handle movable between a first position wherein raising the handle does not alter the position of the lift plate with respect to the cover so that the armature remains substantially fixed with respect to the base, and a second position wherein raising the handle raises the lift plate with respect to the cover so that the armature moves with respect to the base.

6. A disc pack handle and latching assembly as defined in claim 5 further characterized by said yoke being movable within the chamber and being biased to a first position therein, and means acting on the yoke when the handle is raised urging the yoke to move to a second position in the chamber wherein the position of lift plate is not altered by raising the handle, said control means when moved to its second position preventing the yoke from moving to its second position and thereby causing raising of the handle to move the lift plate.

7. A disc pack handle and latching assembly as defined in claim 6 further characterized by means in the chamber confining motion of the yoke to the plane of the handle.

8. A disc pack handle and latching assembly as defined in claim 5 further characterized by said connecting means comprising an arm perpendicular to the lift plate and extending into the chamber, said pivot means comprising a pin extending through the arm and secured to the yoke, and a spring surrounding the arm and urging the lift plate downwardly away from the cover.

9. A disc pack handle and latching assembly as defined in claim 8 further characterized by a bezel mounted on the arm on the bottom side of the cover, said spring being a coil spring around the arm confined between the lift plate and bezel.

10. A disc pack handle and latching assembly as defined in claim 8 further characterized by a hole in the top of the arm through which the pin extends.

11. A disc pack handle and latching assembly as defined in claim 8 further characterized by a hook in the top of the arm engaging the pin and forming the pivotal connection between the yoke and the arm.

12. A disc pack handle and latching assembly as defined in claim 8 further characterized by said connecting means including a second arm identical to and parallel with the first recited arm, a second pin extending through the second arm and disposed in the yoke and a second spring surrounding the second arm.

13. A disc pack handle and latching assembly as defined in claim 5 further characterized by spring means secured to the control means causing the control means to return to assume its first position when the handle is moved from the raised to the horizontal position.

14. A disc pack handle and latching assembly as defined in claim 6 further characterized by said control means including a slide movable in the chamber of the handle, a blocking member carried by and movable with the slide and positioned to engage the yoke and prevent the yoke from moving when the slide is in the second position.

15. A disc pack handle and latching assembly as defined in claim 14 further characterized by spring means in the chamber secured to the slide causing the slide to return to its first position when the handle is moved from the raised to the horizontal position.

16. A disc pack handle and latching assembly comprising a cover having a handle on its upper side that can be raised from a horizontal position to a vertical position on the cover, a lifting means disposed below the handle on the bottom side of the cover for carrying part of a latching assembly for connecting the cover to a base of the pack, a chamber within the handle and a connecting arm secured to the lift means and extending into the chamber, a yoke constantly confined to and movable in the chamber and movable with the handle, pivot means within the chamber pivotally connecting the connecting arm to the yoke, and control means in the chamber for selectively either enabling the yoke to move within the chamber when the handle is raised from the horizontal position whereby the lift means does not affect the condition of the latching assembly, or preventing the yoke from moving within the chamber when the handle is raised whereby the lift means does affect the condition of the latching assembly.

17. A disc pack cover assembly comprising:

a preassembled handle having a chamber formed in the handle, a yoke constantly confined within the chamber and slidable therein, a recess in the yoke and a pin fixed in the recess, control means in the chamber in one position enabling the yoke to slide therein and a second position preventing the yoke from sliding therein, a slot in the handle communicating with the chamber and a slot in the yoke aligned with the slot in the handle and communicating with the recess, a cover with the preassembled handle disposed above it, a lift plate disposed below the cover for carrying an armature forming part of a magnetic latch assembly, a lift arm secured to the plate and extending upwardly through the cover, and a hook formed at the top of the arm and adapted to extend through the slots in the handle and yoke for pivotally engaging the pin in the recess to pivotally connect the arm with the yoke.

18. A disc pack cover assembly as described in claim 17 further characterized by a well in the top surface of the cover for receiving the handle, a notch on each side of the handle and stabilizing pins on each side of the well for engaging the notches, and a ramp leading into each notch enabling the stabilizing pin to slip into the notch when the handle is connected to the hook on the lift arm.

19. A disc pack cover assembly comprising:

a cover, a well in the top of the cover for receiving the handle, a lift plate disposed beneath the cover, a pair of lift arms connected to the lift plate and extending upwardly through the cover and generally perpendicular to it into the well, hook means provided in the tops of the arms and facing one end of the well in the cover, and a preassembled handle having a generally flat configuration and shaped to fit within the recess when placed in a horizontal position, a chamber provided in one end of the handle corresponding to the location of the hooks, said chamber being defined by front, rear, bottom and side walls, a yoke constantly confined within the chamber and slidable between the front and rear walls, a pair of recesses in the yoke and a pivot pin in each recess, and slots in the front and bottom walls of the chamber and in the yoke on the side facing the front wall for enabling the handle to be slipped onto the lift arms so that the hooks engage the pivot pins whereby the handle thereafter may be raised to a vertical position on the cover while attached to the arms.

20. A disc pack cover assembly as defined in claim 17 further characterized by a well in the top surface of the cover for receiving the handle, said well having side walls facing the side walls of the handle;

and pivotal support means in the facing side walls for establishing a pivotal axis for rotation of the handle when it is moved between horizontal and vertical positions on the cover.

21. A disc pack cover assembly as defined in claim 20 further characterized by said pivotal support means including a pivot button mounted on one of the side walls on one side of the handle and having an axially movable shaft and an opening in the other of the side walls on the same side of the handle for receiving the shaft when in its extended position.

22. A disc pack cover assembly as defined in claim 21 further characterized by biasing means for the button urging the shaft to an extended position, and cam means engaging the button for retracting the shaft.

23. A disc pack cover assembly as defined in claim 22 further characterized by a button and cam means being mounted on each side of the handle, and an opening being provided in each side of the handle for receiving the button shafts.

24. A lift plate subassembly for use in a disc pack cover assembly comprising a generally circular lift plate, a pair of cylindrical columns formed as an integral part of the lift plate and extending upwardly from the top surface thereof, an arm mounted in each of the columns and extending upwardly therefrom, said arms having hook means in their upper ends for securing the subassembly to the handle of the disc pack cover, bezels having circular openings receiving the columns and being slidably up and down on the columns, and springs surrounding the columns and engaging the bezels for urging the lift plate away from the bezels.

25. A lift plate subassembly as defined in claim 24 further characterized by means on the bezels and lift plate limiting the relative separation of the plate from the bezels for retaining lift plate, arms, springs and bezels in assembled relationship.

26. A lift plate subassembly as defined in claim 25 further characterized by said means limiting the separation, including barbs formed on the columns of the lift plate and shoulders formed on the bezels and engaged by the barbs when the plate and bezels are moved to selected relative positions.

27. A lift plate subassembly as defined in claim 24 further characterized by each of the bezels having a sleeve that forms a seal with the column for preventing dust or other particles passing through the cover to the interior of a disc pack when the cover is closed.

28. A disc pack handle and latching assembly as defined in claim 5 further characterized by a cover plate secured to the handle for closing the chamber, and a spring connected to the cover plate and the control means for biasing the control means to one of the two positions.

29. A disc pack handle and latching assembly as defined in claim 5 further characterized by a spring connected to the handle and control means for biasing the control means to one of said two positions.

30. A disc pack handle and latching assembly as defined in claim 29 further characterized by said spring being disposed in and confined to said chamber.

* * * * *